INVENTOR
Shoichi Ishikawa
BY Oldham and Oldham
ATTORNEY

United States Patent Office 3,608,394
Patented Sept. 28, 1971

3,608,394
DOUBLE-THROATED WORM GEARING
Shoichi Ishikawa, Yokohama, Japan, assignor to Kabushiki Kaisha Hasegawa Haguruma Tekkosho, Tokyo, Japan
Filed Feb. 4, 1970, Ser. No. 8,584
Claims priority, application Japan, Feb. 13, 1969, 44/10,090
Int. Cl. F16h *1/16, 55/04*
U.S. Cl. 74—425
1 Claim

ABSTRACT OF THE DISCLOSURE

A double-throated worm gearing having an increased load-carrying capacity and an improved transmission efficiency. The worm gears can be produced by a generating method in a continuous fashion with increased efficiency. Particularly, the throated worm wheel has tooth surfaces each including a curved contacting zone effectively engageable with the mating throated worm in addition to a planar contacting zone corresponding to a portion of the planar tooth surface of conventional forms of throated worm wheel.

---

This invention relates to double-throated or double-enveloping type worm gearings and is intended to improve the tooth-surface durability or load-bearing strength and the oil-film maintenance of the gear tooth surfaces and hence to enhance the transmission efficiency of such type of worm gears while enabling them to be produced with increased ease and efficiency.

Accordingly, the present invention has for its object the provision of a double-throated worm gearing including a throated worm having tooth surfaces generated as a developable surface by rolling movement of a worm-cutting or grinding tool representing an imaginary gear having planar tooth surfaces and a throated worm wheel generated by tool means such as a cutting or grinding hob having working edges in the same helical curved surface as the tooth surface of the throated worm or an equivalent cutter having a cutting edge approximating the cutting edges of the hob, said throated worm wheel being thus formed with tooth surfaces each including a curved contacting zone effectively engageable with the mating throated worm in addition to a planar contacting zone which corresponds to the effective contacting region of the planar tooth surface of said imaginary gear.

The above and other objects, features and advantages of the present invention will become apparent from the following description when taken in conjunction with the accompanying drawing, which illustrates a few embodiments of the invention and in which:

FIGS. 1 and 2 schematically illustrate the processes of generating an enveloping or throated worm and a mating throated worm wheel, respectively, according to the present invention;

Heretofore, worm gears of the type described have been publicly known as Wildhaber or so-called "planar" worm gears and the throated worm wheels of Wildhaber gears have their tooth surfaces formed in planes parallel to the wheel axis while those of the latter or "planar" type of worm gears have their tooth surfaces formed in planes inclined to the wheel axis. In either type of gears, the tooth surfaces of the throated worm wheel have been wholly planar, the mating throated worm having tooth surfaces formed as a developable surface conjugate and properly engageable with the corresponding tooth surfaces of the worm wheel.

The mode of meshing engagement between the throated worm and worm wheel in these known types of double-throated worm gearing will next be explained with reference to FIGS. 3 to 6.

Figure 3:
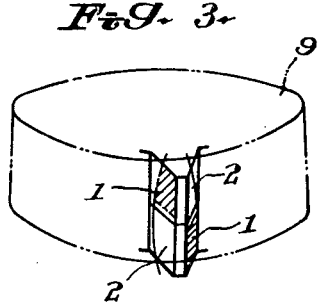
FIG. 3 is a schematic perspective view of a conventional form of throated worm wheel having planar tooth surfaces, showing one tooth thereof.
Figure 5:
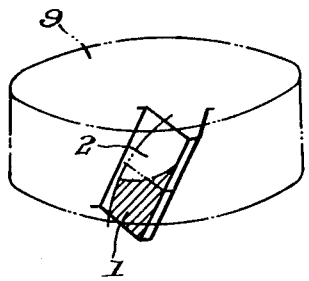
FIG. 5 is a view similar to FIG. 3, showing another conventional form of throated worm wheel, showing one tooth thereof.
Figure 4:
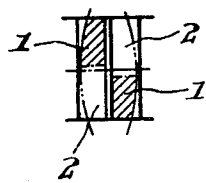
FIG. 4 is a front elevation of the worm wheel tooth shown in FIG. 3.
Figure 6:
FIG. 6 is a view similar to FIG. 4 of the worm wheel tooth shown in FIG. 5.

Referring first to FIGS. 3 and 4, which show one tooth of a Wildhaber worm wheel, the hatched areas 1 each indicates the contacting surface or zone of effective meshing contact of the worm wheel tooth lying on each side thereof and which zone represents that portion of the tooth surface which is covered by the passing line of contact with the worm surface and includes that half portion of the tooth surface which is advanced in the direction of sliding movement of the surface relative to the mating worm. Reference numeral 2 indicates the remaining portion of the tooth surface, which is not engageable with the mating worm tooth and ineffective for meshing drive.

The mode of meshing engagement in so-called "planar" type worm gears is substantially the same as that in Wildhaber type gears described above and is shown in FIGS. 5 and 6, in which the same reference numerals as employed in FIGS. 3 and 4 are used for convenience of comparison.

Such localized tooth engagement in conventional double-throated worm gears are undesirable as it naturally impairs the maintenance of an oil film between the cooperating tooth surfaces and produces an unduly large pressure of contact therebetween, causing remarkable localized wear and hence reduction in service life and transmission efficiency of such worm gearing.

Figure 1:
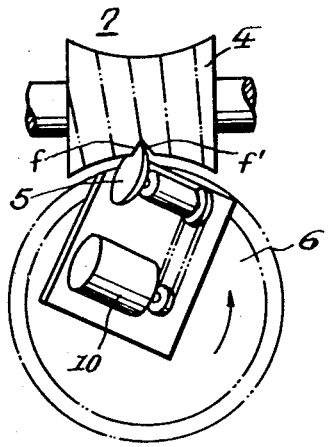
Figure 2:
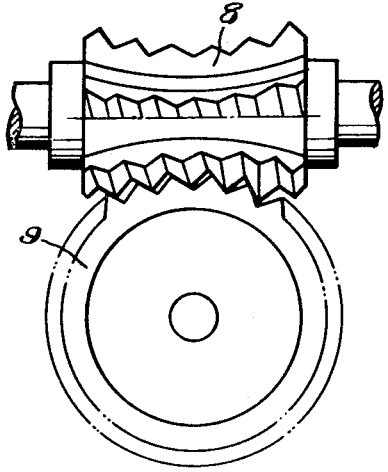

These deficiencies involved in conventional double-enveloping or throated worm gears can be successfully eliminated according to the present invention, in which the throated worm and worm wheel are generated by the respective processes shown in FIGS. 1 and 2 and specifically the tooth surface of the throated worm wheel includes a curved contacting zone effectively engageable with the tooth surface of the throated worm in addition to a planar contacting zone which corresponds to the previously described zone of effective meshing contact of conventional throated worm wheels.

Referring to FIG. 1, reference numeral 4 indicates a throated worm blank and reference numeral 5 indicates a forming tool such as a milling cutter or grinding wheel, which is driven to rotate by means of an appropriate electric motor 10. The generating motion of the imaginary gear 6 represented by the tool 5 is equal to the rotative motion of the mating throated worm wheel and serves to generate the tooth surface $f$ on one side of the worm tooth. It will be apparent that the tooth surface $f'$ on the other side of the worm tooth can be generated by reversing the tool arrangement from right to left hand to complete the desired throated worm 7.

Referring next to FIG. 2, the throated worm wheel 9 can be generated upon the basis of the throated worm 7 by employing a tool 8 in the form of a hob having cutting or grinding edges formed in a helically curved surface corresponding to the tooth surface of the worm 7 or a cutter having a cutting edge approximating the cutting edges of such hob. Obviously, the tool and the worm wheel blank are to be positioned in the same relationship as that required for the meshing engagement of such throated worm gears.

Figure 7:
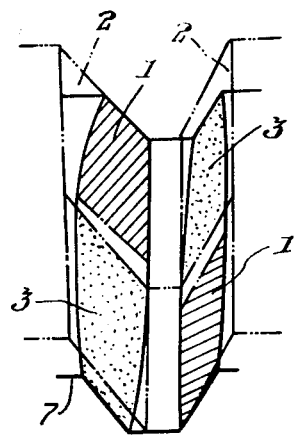
FIG. 7 is an enlarged perspective view showing one of the gear teeth of one form of throated worm wheel made according to the present invention.
Figure 8:
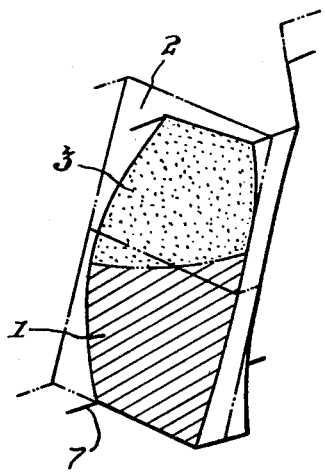
FIG. 8 is a view similar to FIG. 7, showing one of the gear teeth of another form of throated worm wheel made according to the present invention.

As shown in FIGS. 7 and 8, the tooth surfaces of the throated worm wheel 9 generated in the manner described above each include a contacting surface comprised of a curved contacting zone 3, which is shown dotted and effectively engageable with the mating throated worm 7, in addition to a planar contacting zone 1, which corresponds to the effective contacting region of the planar tooth surface of conventional throated worm wheels. This means that the inffective portions 2 of the planar tooth surfaces of the conventional throated worm wheels shown in FIGS. 3 to 6 have substantially been replaced, in the throated worm wheel 9 of the present invention, by the curved contacting zones 3, which are effectively engageable with the mating throated worm 7, as described above. The two forms of throated worm wheel shown in FIGS. 7 and 8, obviously correspond to the Wildhaber and "planar" types of throated worm wheel shown in FIGS. 3–4 and 5–6, respectively. The mode of meshing engagement is substantially the same in both forms of throated worm wheel shown in FIGS. 7 and 8 except that in the form of FIG. 8 the planar contacting zones 1 lie in a position opposite to those in FIG. 7 relative to the curved contacting zones 3.

It is to be noted that the provision of the curved contacting zones 3 according to the present invention means that any point of contact on the tooth surface of the throated worm 7 is brought into contacting engagement with a definite tooth surface of the mating worm wheel not only in a position on the planar contacting zone thereof (which position corresponds to a position in which the line normal to the worm tooth surface extends at right angles to the relative velocity of the interengaging tooth surfaces of the worm and worm wheel, allowing both tooth surfaces to maintain contact with each other), but also in another position on the same worm wheel tooth surface outside of the planar contacting zone and, basically, this additional contacting engagement accounts for the generation of the curved contacting zone on the worm wheel tooth. The presence of such additional contacting zone or the tooth engagement effected twice between the interengaging worm gear teeth has previously been known theoretically with the Hindley type of worm gears, which is the protype of double-throated worm gears. It has also been previously known that the load-bearing capacity of such worm gearing is attributable principally to the additional contacting zone but not obtainable by meshing contact of the interengaging gear teeth previously assumed in the medial plane of the worm wheel extending at right angles to its axis.

It is to be understood that the present invention is a development from these previously known facts and lies in principal in the provision of such additional, curved contacting zone on the developable form of tooth surface of throated worm gears.

The double-throated worm gearing of the present invention, including a throated worm wheel having an additional, curved contacting zone on each of its tooth surfaces, has various advantages in comparison with conventional types of double-throated worm gearing including a throated worm wheel formed simply with planar tooth surfaces. Namely, in the worm gearing of the present invention, the worm wheel tooth surface has its ineffective, non-contacting area substantially diminished with a corresponding increase in effective area of meshing contact and this together with the fact that the incremental portion of the effective, contacting area is curved leads to a substantial increase in surface strength or load-bearing capacity of the tooth surface while improving the maintenance of oil film between the meshing tooth surfaces and thus the transmission efficiency of the gearing. Moreover, the throated worm wheel can be produced with much increased efficiency by continuous indexing or rolling movement employing a cutting or grinding hob or the like tool whereas conventional forms of throated worm wheel can only be produced by intermittent indexing movement.

What is claimed is:

1. A double-throated worm gearing including a throated worm generated by tool means such as a milling cutter, a grinding wheel or the like tool representing an imaginary gear having planar tooth surfaces by imparting to such tool means a movement relative to the worm blank which is similar to that of a mating throated worm wheel and a throated worm wheel generated by tool means such as a cutting or grinding hob having working edges in the same helical curved surface as the tooth surface of said throated worm or a cutter having a cutting edge formed approximate to the cutting edges of the hob, said throated worm wheel being thus formed with tooth surfaces each including a curved contacting zone effective for meshing contact with said throated worm in addition to a planar contacting zone corresponding to that region of the planar tooth surface of said imaginary gear which is effective for meshing contact.

References Cited

UNITED STATES PATENTS

| | | | |
|---|---|---|---|
| 1,790,606 | 1/1931 | Trbojevich | 74—458 |
| 2,821,865 | 2/1958 | Ufert | 74—458 |
| 2,977,726 | 4/1961 | Daniel | 74—458X |

LEONARD H. GERIN, Primary Examiner

U.S. Cl. X.R.

74—458